(12) United States Patent
Pasquero et al.

(10) Patent No.: US 8,730,188 B2
(45) Date of Patent: May 20, 2014

(54) GESTURE INPUT ON A PORTABLE ELECTRONIC DEVICE AND METHOD OF CONTROLLING THE SAME

(75) Inventors: Jerome Pasquero, Kitchener (CA); Eric Phillip Loney, Waterloo (CA); Daniel James Legg, Kitchener (CA); Noel John Orland Stonehouse, Waterloo (CA); Jason Tyler Griffin, Kitchener (CA)

(73) Assignee: BlackBerry Limited, Waterloo (CA)

( * ) Notice: Subject to any disclaimer, the term of this patent is extended or adjusted under 35 U.S.C. 154(b) by 95 days.

(21) Appl. No.: 12/977,978

(22) Filed: Dec. 23, 2010

(65) Prior Publication Data

US 2012/0162092 A1    Jun. 28, 2012

(51) Int. Cl.
*G06F 3/041* (2006.01)
(52) U.S. Cl.
USPC .......................................... 345/173; 345/156
(58) Field of Classification Search
USPC ................................................ 345/156, 173
See application file for complete search history.

(56) References Cited

U.S. PATENT DOCUMENTS

| | | | |
|---|---|---|---|
| 7,567,236 B2 * | 7/2009 | Nakayama et al. | 345/168 |
| 8,059,101 B2 * | 11/2011 | Westerman et al. | 345/173 |
| 2005/0210402 A1 | 9/2005 | Gunn et al. | |
| 2005/0270269 A1 * | 12/2005 | Tokkonen | 345/156 |
| 2009/0061928 A1 * | 3/2009 | Lee et al. | 455/556.1 |
| 2009/0192786 A1 * | 7/2009 | Assadollahi | 704/9 |
| 2010/0073329 A1 | 3/2010 | Raman et al. | |
| 2010/0225599 A1 * | 9/2010 | Danielsson et al. | 345/173 |

FOREIGN PATENT DOCUMENTS

| | | | |
|---|---|---|---|
| EP | 1422599 A1 | 5/2004 | |
| EP | 1887451 A2 | 2/2008 | |
| WO | 2010018579 A2 | 2/2010 | |
| WO | WO 2010028579 A2 * | 2/2010 | G06F 21/20 |
| WO | 2010034842 A1 | 4/2010 | |

OTHER PUBLICATIONS

Extended European Search Report dated Apr. 7, 2011, issued from the corresponding European patent application No. 10196757.8.
Website: http://www.mobiletextinput.com/Product/SlideIT/SlideIT.php published at least as early as Nov. 3, 2010.
Website: http://swypeinc.com published at least as early as Nov. 3, 2010.
Website: http://en.wikipedia.org/wiki/Graffiti_%28Palm_OS%29 published at least as early as Nov. 3, 2010.
Website: http://mrl.nyu.edu/projects/quikwriting/ published at least as early as Nov. 3, 2010.
European Office Action dated Mar. 14, 2013, issued from the corresponding European patent application No. 10196757.8.
Examiner's Report dated Nov. 1, 2013, issued from the corresponding Canadian patent application No. 2,756,329.

* cited by examiner

*Primary Examiner* — Kwang-Su Yang
(74) *Attorney, Agent, or Firm* — Geoffrey deKleine; Borden Ladner Gervais LLP

(57) ABSTRACT

A method of controlling an electronic device, including a touch-sensitive display, includes detecting a gesture associated with a gesture character entry mode and determining a direction of the gesture on the touch-sensitive display, determining ones of a plurality of characters associated with the gesture based on the direction, and adding the ones of the plurality of characters to candidate character strings.

19 Claims, 14 Drawing Sheets

US 8,730,188 B2

GESTURE INPUT ON A PORTABLE ELECTRONIC DEVICE AND METHOD OF CONTROLLING THE SAME

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive display may be modified depending on the functions and operations being performed.

Improvements in electronic devices with touch-sensitive displays are desirable.

BRIEF DESCRIPTION OF THE DRAWINGS

Embodiments of the present disclosure will now be described, by way of example only, with reference to the attached Figures, wherein.

DETAILED DESCRIPTION

Figure 1:
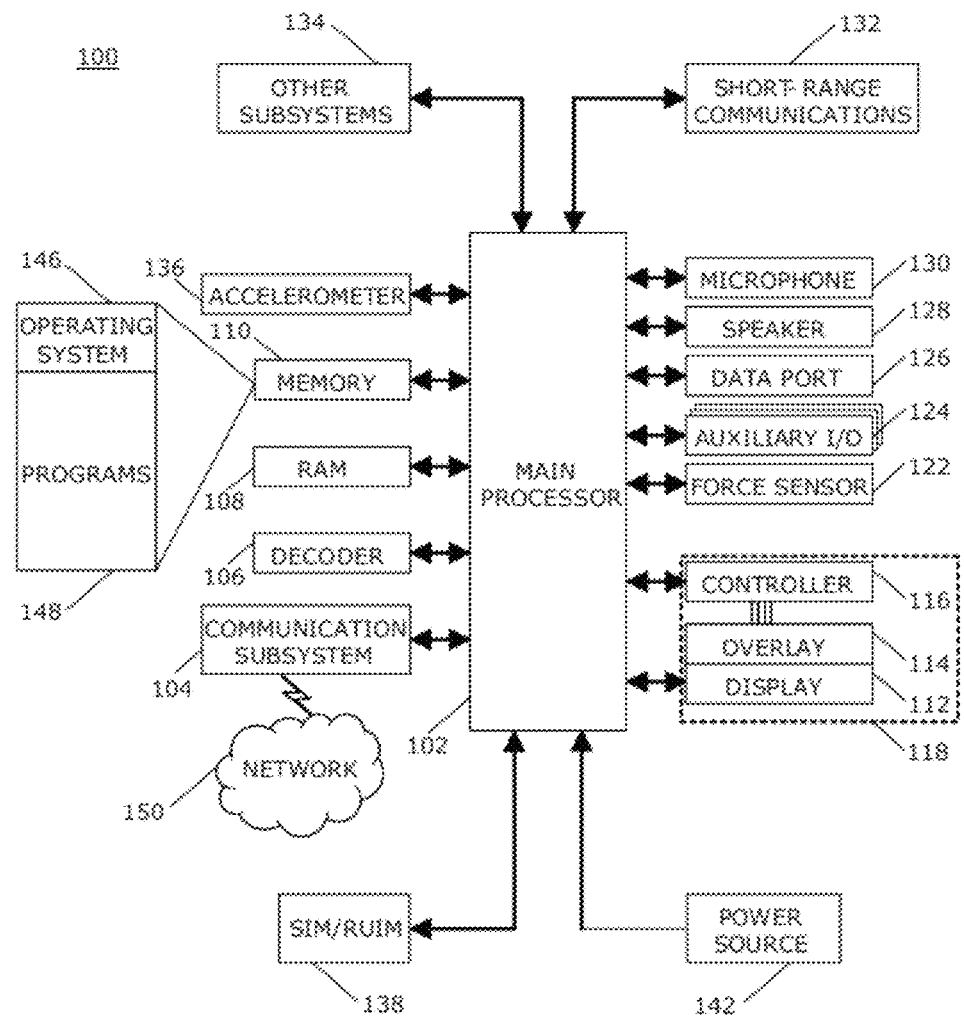
FIG. 1 is a block diagram of a portable electronic device in accordance with an example embodiment.

The following describes a method of controlling an electronic device including a touch-sensitive display. The method includes detecting a gesture associated with a gesture character entry mode and determining a direction of the gesture on the touch-sensitive display, determining ones of a plurality of characters associated with the gesture based on the direction, and adding the ones of the plurality of characters to candidate character strings.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable electronic device in the embodiments described herein. Examples of portable electronic devices include mobile, or handheld, wireless communication devices such as pagers, cellular phones, cellular smart-phones, wireless organizers, PDAs, wirelessly enabled notebook computers, tablet computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor such as an accelerometer 136 to detect direction of gravitational forces or gravity-induced reaction forces so as to determine, for example, the orientation of the portable electronic device 100.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 112 of the touch-sensitive display 118 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Similarly, multiple simultaneous touches, are detected.

One or more gestures are also detected by the touch-sensitive display 118. A gesture, such as a swipe, also known as a flick, is a particular type of touch on a touch-sensitive display 118 that begins at an origin point and continues to an end point. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture.

In some example embodiments, an optional force sensor 122 or force sensors may be disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
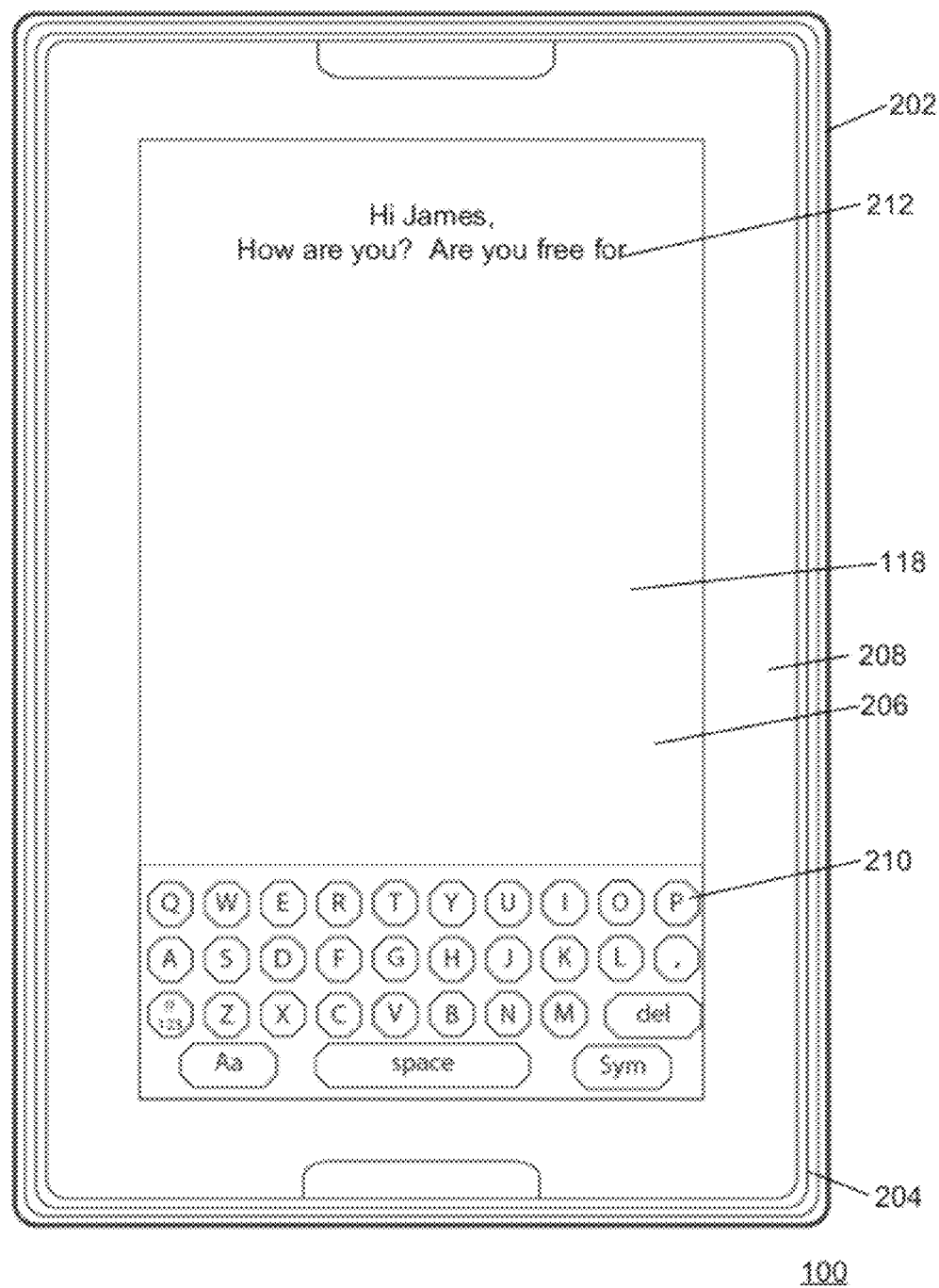
FIG. 2 is a front view of an example of a portable electronic device.

A front view of an example of the portable electronic device 100 is shown in FIG. 2. The portable electronic device 100 includes a housing 202 that houses components such as the components shown in FIG. 1. The housing 202 may include a back, sidewalls, and a front 204 that frames the touch-sensitive display 118.

In the example of FIG. 2, the touch-sensitive display 118 is generally centered in the housing 202 such that the display area 206 of the display 112 is generally centered with respect to the front 204 of the housing. The non-display area 208 extends around the display area 206.

The touch-sensitive overlay 114 extends over the display area 206. Optionally, the touch-sensitive overlay 114 may also cover the non-display area 208 such that a touch on the non-display area 208 is also detectable. In the example of FIG. 2, a keyboard 210 is displayed on the touch-sensitive display 118 of the portable electronic device 100 for entry of characters such as alphabetical letters, numerals or other characters in a field 212 of an application. In the example illustrated in FIG. 2, the keyboard 210 is a QWERTY keyboard. Other keyboards may be utilized such as, for example, a QWERTZ keyboard or an AZERTY keyboard.

Figure 3:
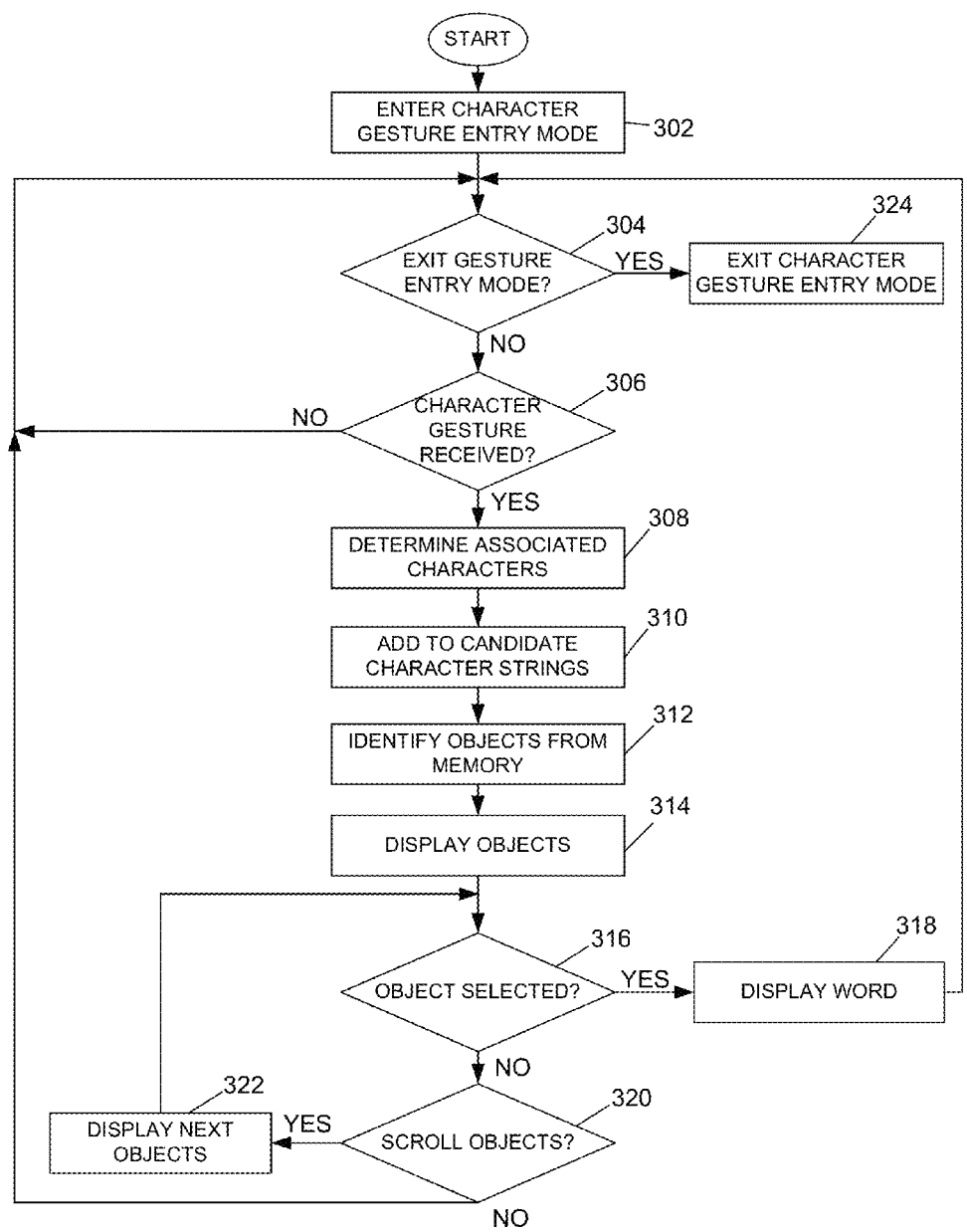
FIG. 3 is a flowchart illustrating an example of a method of controlling the portable electronic device in accordance with the disclosure.

A flowchart illustrating a method of controlling an electronic device, such as the portable electronic device 100, is shown in FIG. 3. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order.

The process may be carried out in any suitable application such as an email application, a text messaging application, a calendar application, a tasks application, an address book application, a web browser application, or any other suitable application in which information may be entered into a field or body in a graphical user interface. Information from the application is displayed on the touch-sensitive display 118 of the portable electronic device 100. A character gesture entry mode is entered at 302. The character gesture entry mode is a mode of operation of the portable electronic device 100 in which characters, such as the letters illustrated on the keyboard 210, are associated with gesture directions and may be entered utilizing gestures on the touch-sensitive display 118. The character gesture entry mode may be entered in any suitable manner.

When an input, such as a gesture, that is not associated with the gesture entry mode is received at 304, the gesture entry mode is exited at 324.

When a gesture that is associated with a character or characters is detected at 306, the method continues at 308 where the associated characters are determined based on a direction of the gesture. Candidate character strings are determined at 310, for example, by adding characters to determine possible combinations of character strings.

The portable electronic device 100 includes stored data that comprises, for example, one or more dictionaries, as well as words, acronyms, and other character combinations previously entered into the portable electronic device, each of which is referred to herein as an object. The stored data may be found, for example, in memory 110. Objects that at least partially match the character string are identified at 312. Matching may include, for example, matching of the entire character string with the initial part of an object, without any missing or different characters. Capitalization of letters may be ignored for the purpose of matching.

One or more of the objects identified at 312 may be displayed at 314. When the object is selected, for example, by a touch, on the touch-sensitive display 118, at an area associated with the object, the object, or word, is added in the field or body displayed on the portable electronic device 100 at 318. When a displayed object is not selected at 316, the displayed object or objects may be scrolled to display a next object or objects in the group of identified objects. The objects may be scrolled in any suitable manner, for example, by utilizing a scrolling gesture. When the scrolling gesture is received at 320, the next object or objects in the group of identified objects is displayed at 322. Otherwise, the process continues at 304.

Figure 4:
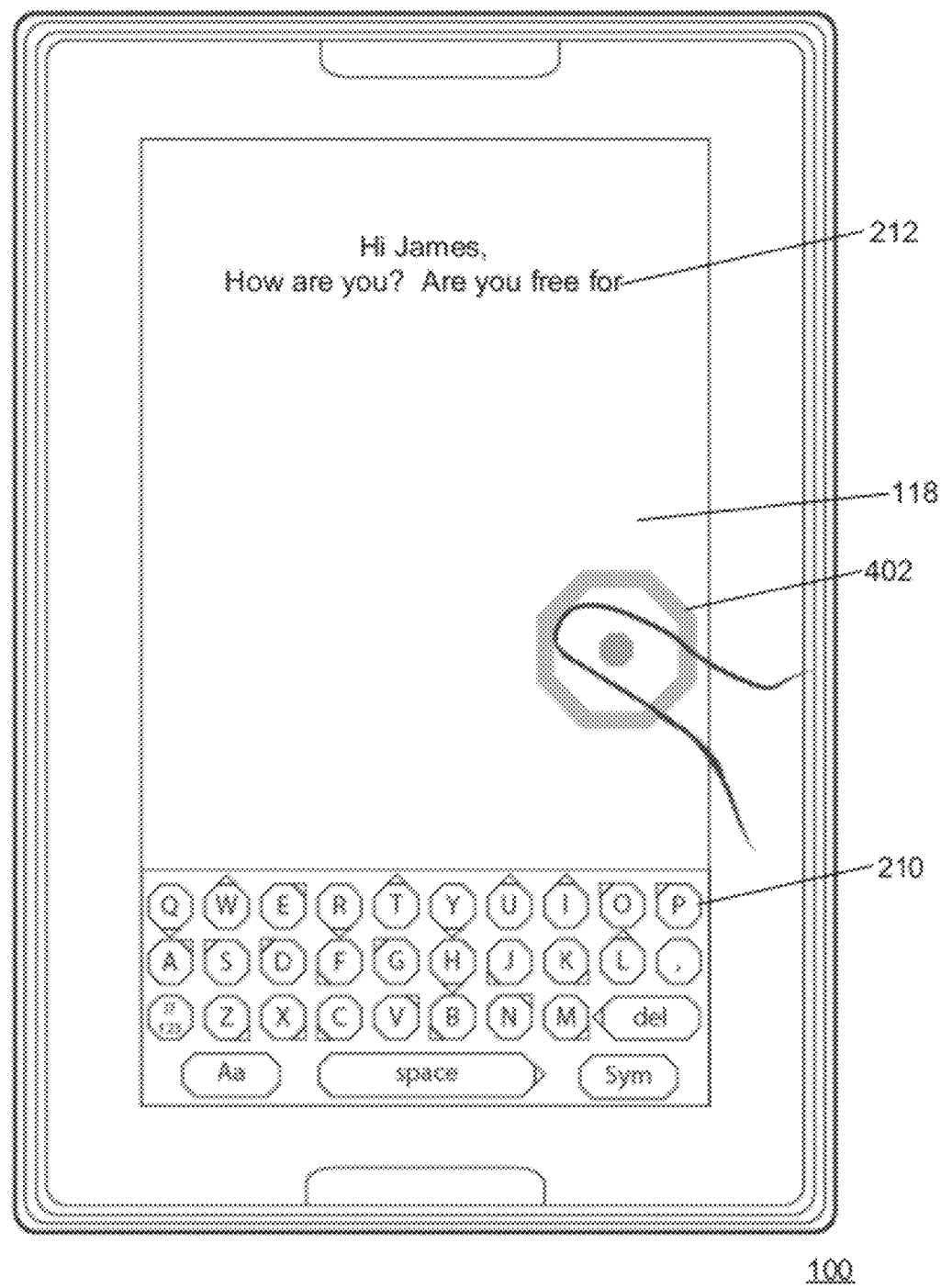
FIG. 4 through FIG. 6 illustrate examples of control of a portable electronic device according to the method of FIG. 3.

One example in accordance with the method of FIG. 3 is illustrated in FIG. 4. In the example illustrated in FIG. 4, the character gesture entry mode is entered when a touch is maintained on the touch-sensitive display 118 for a threshold period of time. Thus, the character gesture entry mode is entered when a touch is maintained on the touch-sensitive display 118, for example, for 2 seconds. A gesture entry mode indicator is displayed on the touch-sensitive display 118 as a notification that the gesture entry mode is turned on or active. In the example illustrated in FIG. 4, the indicator is a hexagonal indicator 402 that is displayed at a location that is centered on the location of the touch detected at 302. The hexagonal indicator 402 is utilized to illustrate the directions of gestures that are associated with characters in the gesture entry mode. Each of the eight sides of the hexagonal indicator 402 is associated with at least one character.

The keys of the keyboard 210 illustrated in FIG. 2 are also illustrated as hexagons. Upon entry into the gesture entry mode at 302, the keys indicate directions associated with the characters of the keyboard 210. Two sides of each key that is associated with an alphabetical letter, the delete key, and the space key, are extended to form an arrow that indicates the direction associated with the respective character or function. As illustrated, the letters Q, R, Y, and H are each associated with a down direction. The letters W, T, U, I, and L are each associated with an up direction. The letters E, A, V, and N are each associated with a diagonal direction up and to the right. The letters O, P, S, and G are each associated with an diagonal direction up and to the left. The letters F, J, C, and B are each associated with an diagonal direction down and to the left. The letters K, Z, X, and M are each associated with a diagonal direction down and to the right. The delete key is associated with a left direction and the space key is associated with a right direction. The terms right, left, up, and down are utilized for the purpose of providing a full explanation and are utilized with reference to the orientation of the displayed information as illustrated in the Figures.

When a gesture that is associated with a character or characters is detected at 306, the method continues at 308 where the associated characters are determined based on a direction of the gesture. A gesture is associated with a character or characters when the gesture begins within the hexagonal indicator 402 and ends outside the hexagonal indicator 402. The direction of the gesture is determined based on the start location and the end location of the gesture. The end location is the location at which the finger is removed from the screen and the touch is no longer detected. The direction of the gesture is determined to be one of the eight directions, up, down, diagonally up and to the right, diagonally up and to the left, diagonally down and to the right, diagonally down and to the left, left, and right, by matching the direction defined by the start and end points of the gesture to the closest one of the eight directions.

A user may adjust the direction of the gesture by moving the location of the gesture to adjust the end point prior to ending the gesture. The end location is the last-detected location of the touch, at which the finger is lifted from the screen. Optionally, the keys for the letters associated with the direction may be indicated, for example, by highlighting the keys based on the location of the touch prior to ending the touch. A user may therefore adjust the direction of the touch to highlight a different set of keys prior to ending the touch.

Candidate character strings are determined. To determine the candidate character strings, each of the characters associated with the direction are added to the candidate character strings. If no character is in the character string at this time, the characters are each added to start candidate character strings. If other characters are already included in character strings, the characters associated with the direction are added. The added characters may increase the number of candidate character strings as all the possible combinations of character strings with associated characters may be added. A space may end a character string and a new character string is started when the next gesture that is associated with a character is received. A delete function may remove the previous character or space and return to a previous character string or strings.

Figure 5:
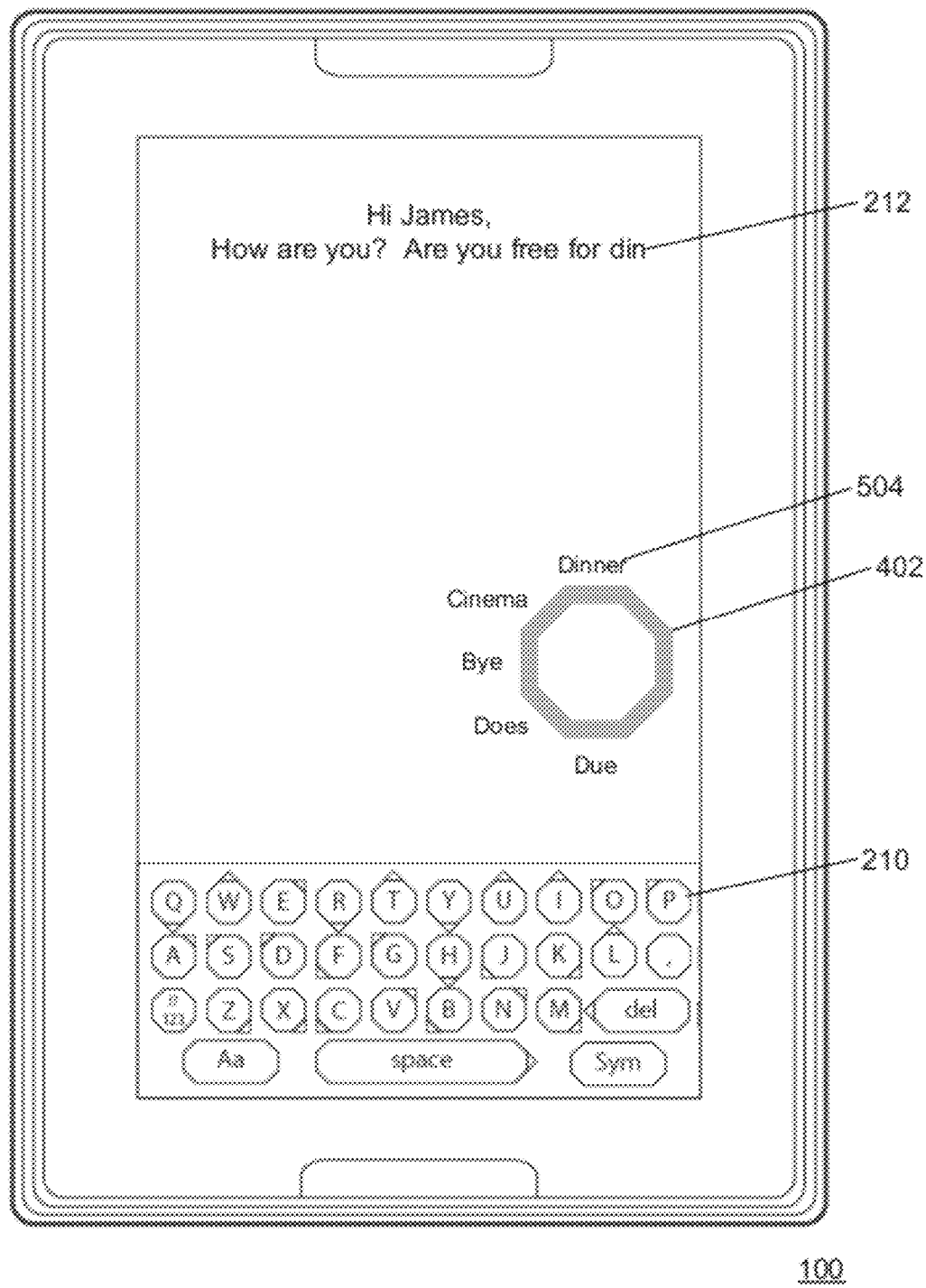

The objects that at least partially match the character string are identified at 312 by a comparison of the candidate character strings to the objects in memory. The objects that are identified at 312 may be displayed around the hexagonal indicator 402 as selectable features 504, as illustrated in FIG. 5. For the purpose of this example, five objects are displayed as selectable features 504. The five objects displayed are the objects that have an initial portion that is identical to one of the candidate character strings. The objects displayed may be, for example, the five most common objects utilized on the portable electronic device 100 that at least partially match a candidate character string. Thus, the objects that at least partially match a candidate character string may be ordered from the most common objects that at least partially match to the least common, based on use of the portable electronic device 100. Alternatively, the objects may be ordered in alphabetical order. Each of the objects is selectable, for example, by a touch on an associated area at which the object is displayed, as illustrated by the circle 606 in FIG. 6. When an object is selected at 316, the word is displayed in the field 212 in which information is being added, such as the body of a message or other suitable field.

In the present example, a letter is added in the field 212 after each gesture. The letter that is added may be the letter of the candidate character string that at least partially matches the most likely word, or most common object. In the example of FIG. 5, the most common object identified is the word "Dinner" and the letters "din" corresponding to the three gestures received, are added. Alternatively, the letter that is added may be the letter of the candidate character string that exactly matches the most likely word, or most common object such that the letters displayed are complete words that match an object. In another alternative, placeholder symbols such as, for example an asterisk or underlining, may be added until an object is selected at 316.

When an object is not selected at 316, the objects displayed as selectable features around the hexagonal indicator 402 may be scrolled at 320 to display the next five objects at 322. The objects, which are displayed as selectable features 504 may be scrolled by a gesture such as a swipe that begins on one of the selectable features 504 or within a threshold distance of the selectable features 504 or the hexagonal indicator 402. The swipe may be a swipe in any suitable direction such as up, down, clockwise, or counter-clockwise. When an object is not selected and the objects are not scrolled, or are no longer scrolled, the process continues at 304.

Figure 6:
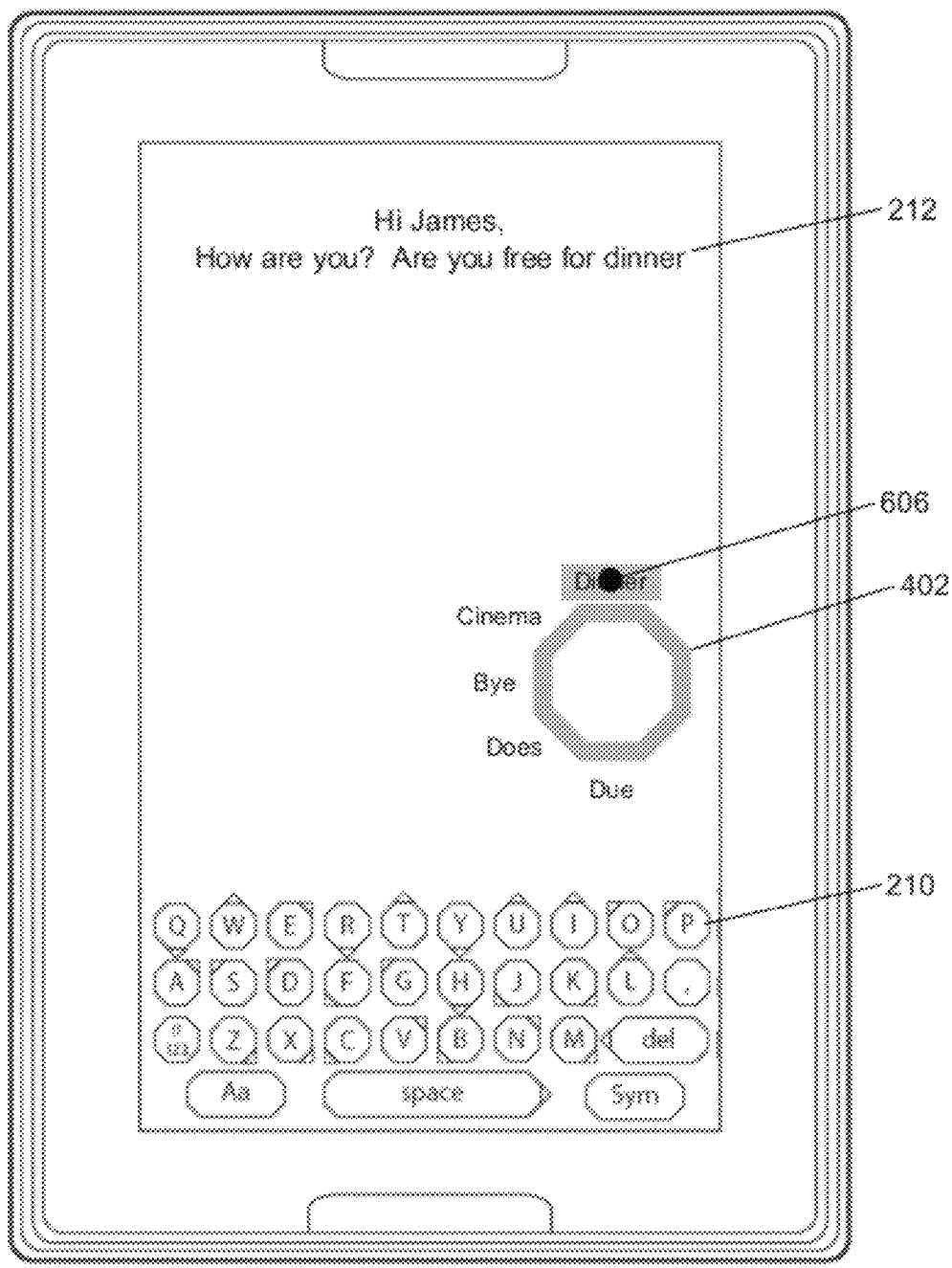
Figure 7:
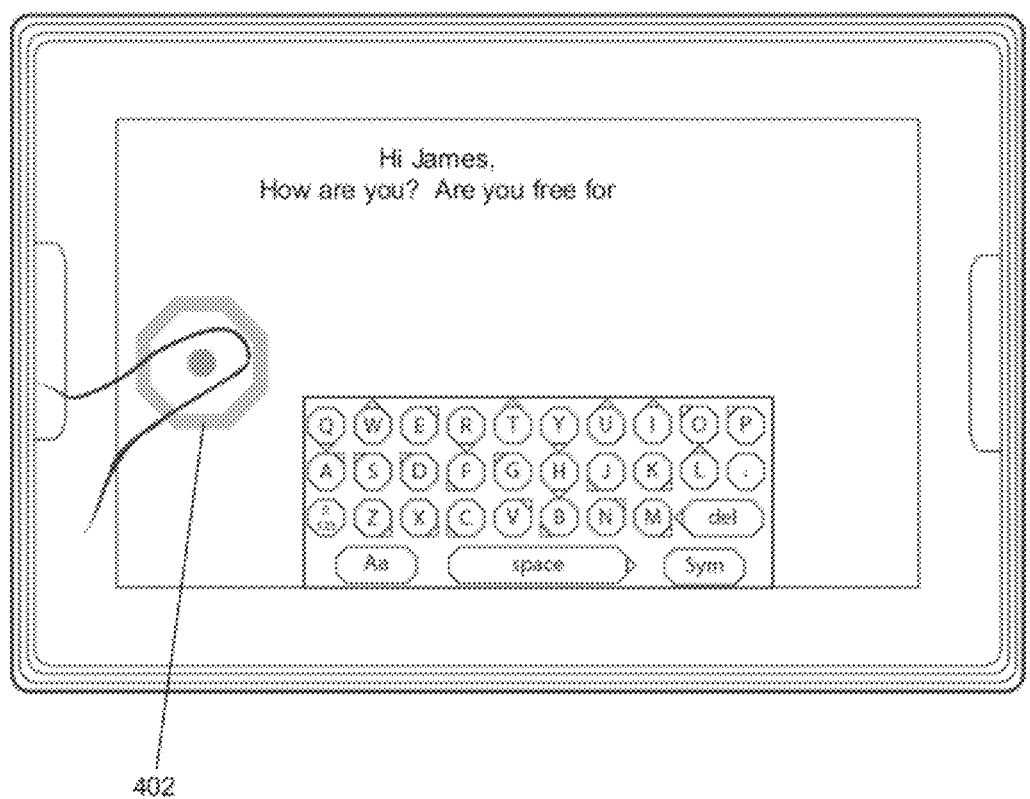
FIG. 7 illustrates another example of control of a portable electronic device according to the method of FIG. 3.

In FIG. 4 through FIG. 6, the portable electronic device 100 is illustrated in a portrait orientation and the indicator, which is a hexagonal indicator 402 in the examples illustrated, is located on a right side of the touch-sensitive display 118. The portable electronic device 100 may also be utilized in a landscape orientation and the indicator may be located on any part of the touch-sensitive display 118. In the example illustrated in FIG. 7, the hexagonal indicator 402 is located on a left side of the display. Optionally, two indicators may be utilized for character entry using two hands.

Figure 8:
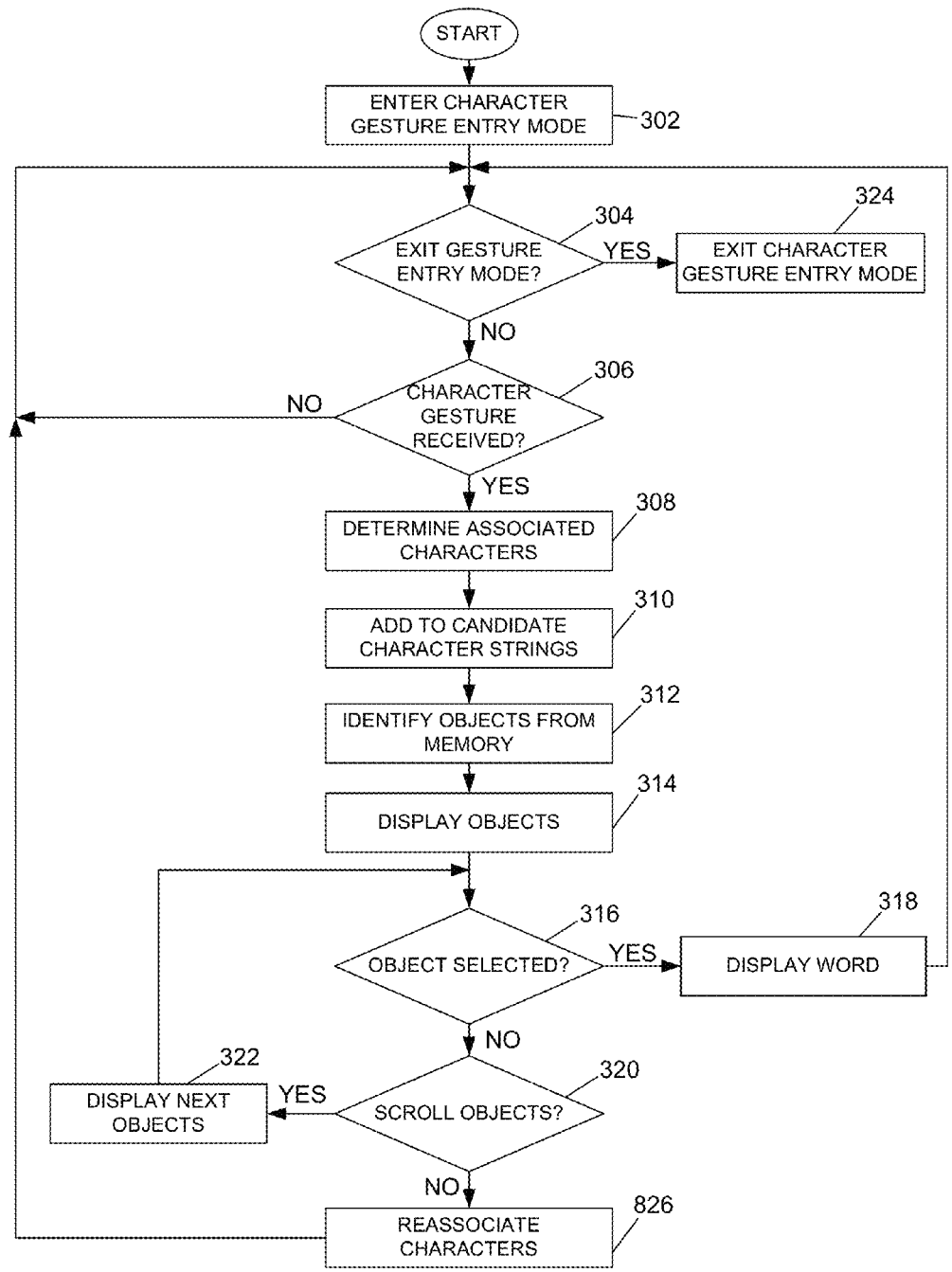
FIG. 8 is a flowchart illustrating another example of a method of controlling the portable electronic device in accordance with the disclosure.

A flowchart illustrating another example of a method of controlling an electronic device, such as the portable electronic device 100, is shown in FIG. 8. The method may be carried out by computer-readable code executed, for example, by the processor 102. Coding of software for carrying out such a method is within the scope of a person of ordinary skill in the art given the present description. The method may contain additional or fewer processes than shown and/or described, and may be performed in a different order. The method shown in the flowchart of FIG. 8 is similar to the method shown in the flowchart of FIG. 3 and therefore similar reference numerals are used to illustrate similar processes. In the method of FIG. 8, however, the associations of characters with directions is changed at 826 such that at least some of the characters are associated with directions that are different from the directions that the same characters were previously associated with prior to receipt of the last gesture associated with a character. Thus, the association of directions with characters may be dynamic to facilitate character selection and/or word or object matching.

Figure 9:
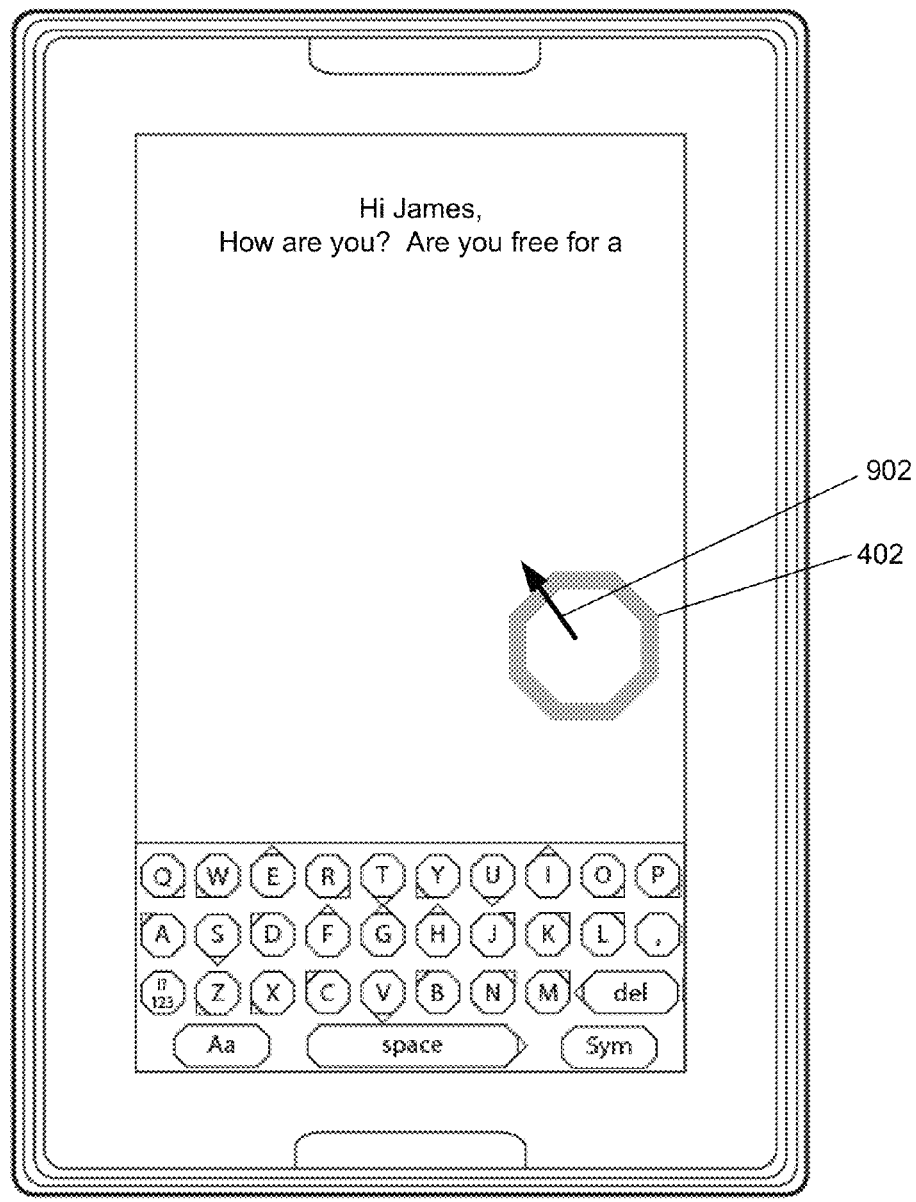
FIG. 9 through FIG. 11 illustrate examples of control of a portable electronic device according to the method of FIG. 8.
Figure 10:
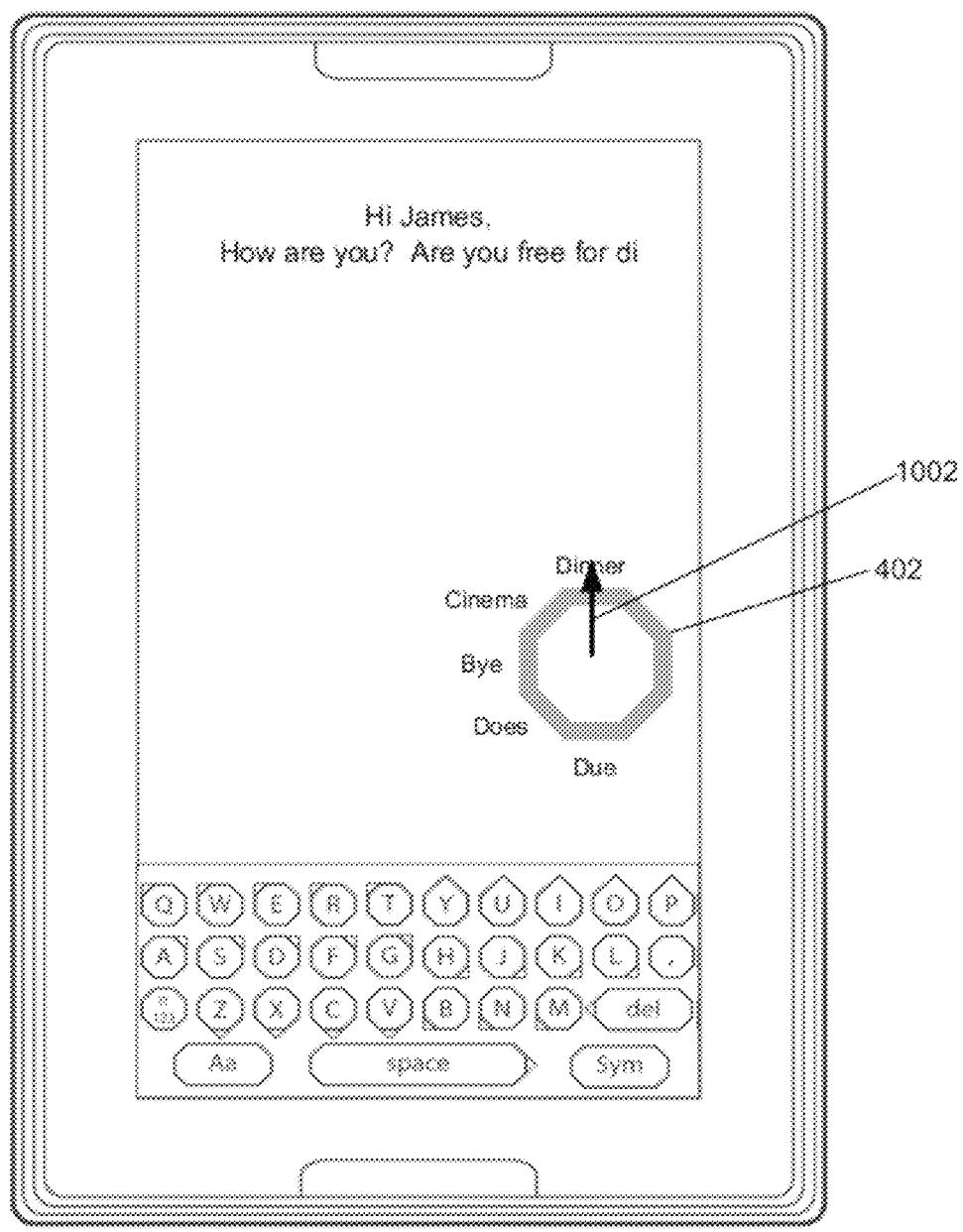
Figure 11:
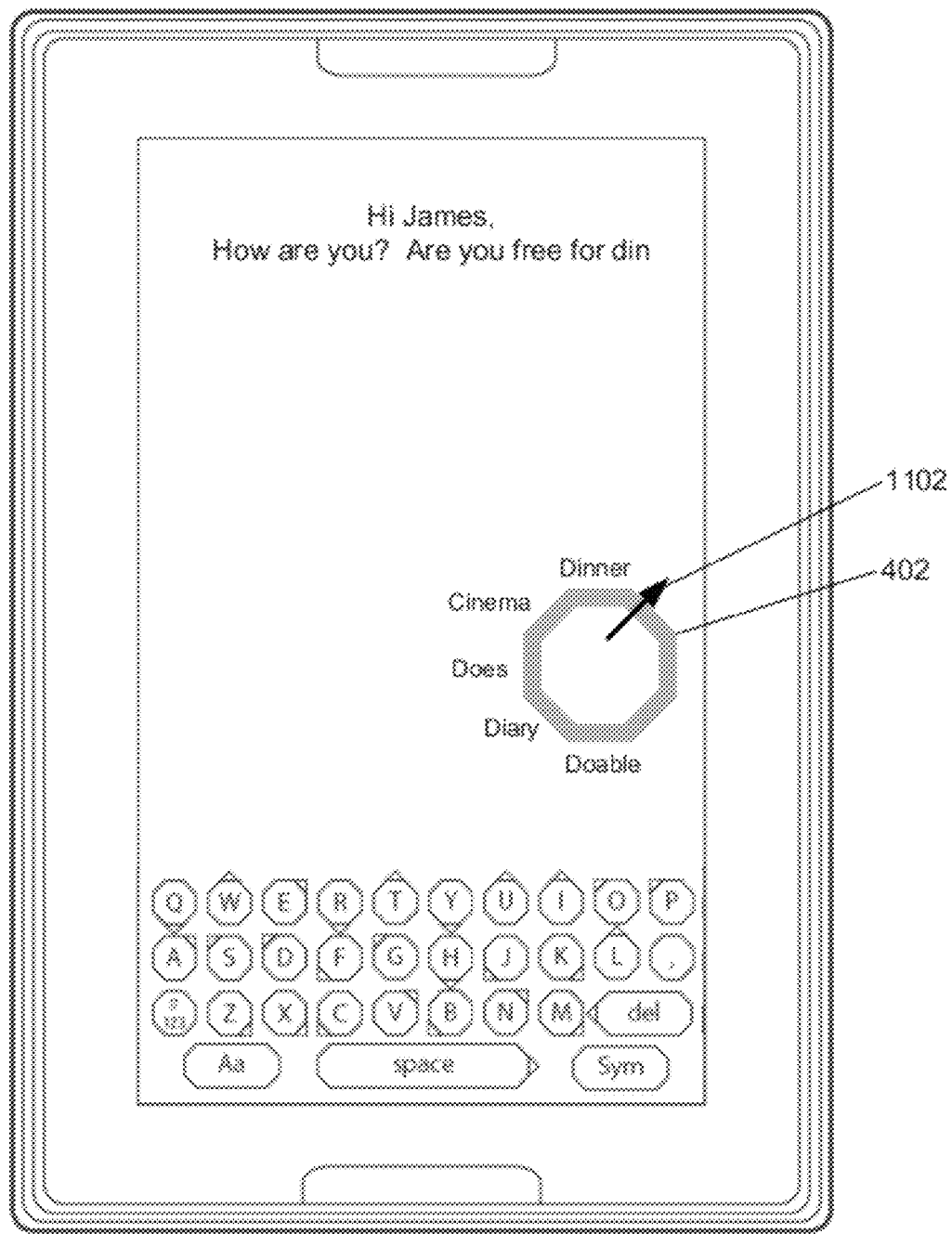

One example in accordance with the method of FIG. 8 is illustrated in FIG. 9, FIG. 10, and FIG. 11. In the example illustrated in FIG. 9, the character gesture entry mode is entered when a touch is maintained on the touch-sensitive display 118, for example, for at least two seconds. Other suitable threshold time periods may be utilized, such as three seconds. The hexagonal indicator 402 is displayed at a location that is centered on the location of the touch detected at 302. A gesture, in the form of a swipe is received, beginning inside the hexagonal indicator 402 and ending up and to the left, as illustrated by the arrow 902. In the present example, the letters A, B, C, and D are associated with the direction of the gesture, as determined at 308. One of the letters A, B, C, and D is the first letter in the word being entered. Objects may be identified at 312 and displayed at 314. Objects are not selected or scrolled and the directions associated with characters are changed. Optionally, identification of objects and display of the objects for selection may be delayed until further swipes are received.

A second swipe is received at 306, beginning inside the hexagonal indicator 402 and ending above, as illustrated by the arrow 1002 in FIG. 10. In the present example, the up swipe is associated with the letters Y, U, I, O, and P, rather than E, F, G, H, and I as illustrated in FIG. 9. The letters Y, U, I, O, and P are added to the candidate character strings at 308 and objects that at least partially match the candidate character strings are identified at 310. The objects are ordered based on frequency of use.

A third swipe is received at 306, beginning inside the hexagonal indicator 402 and up and to the right, as illustrated by the arrow 1102 in FIG. 11. In the present example, the swipe is associated with the letters E, N, V, and A, rather than A, S, D, F, and G as illustrated in FIG. 10. The letters E, N, V, and A are added to the candidate character strings at 308 and objects that at least partially match the candidate character strings are identified at 310. The objects are ordered based on frequency of use. For the purpose of the present example, the objects include the words "Dinner", "Cinema", "Ain't", "Bye", "Does", and others. The two most frequently used words include the words "Dinner" and "Cinema". When an object is not selected and the user continues to enter characters by swiping, the portable electronic device 100 may change the associations of directions with letters such that the letter "n" and the letter "e", which are the next letters in the first two objects in the ordered list of identified objects, are associated with two different directions. By associating the letter "n" and the letter "e" with two different directions, the two most likely next letters are associated with two different directions.

As described above, a letter may be added in the field after each gesture. The letter that is added may be the letter of the candidate character string that at least partially matches the most likely word, or most common object. Alternatively, the letter that is added may be the letter of the candidate character string that exactly matches the most likely word, or most common object such that the letters displayed are complete words that match an object. In another alternative, placeholder symbols such as, for example an asterisk or underlining, may be added until an object is selected at 316.

Figure 12:
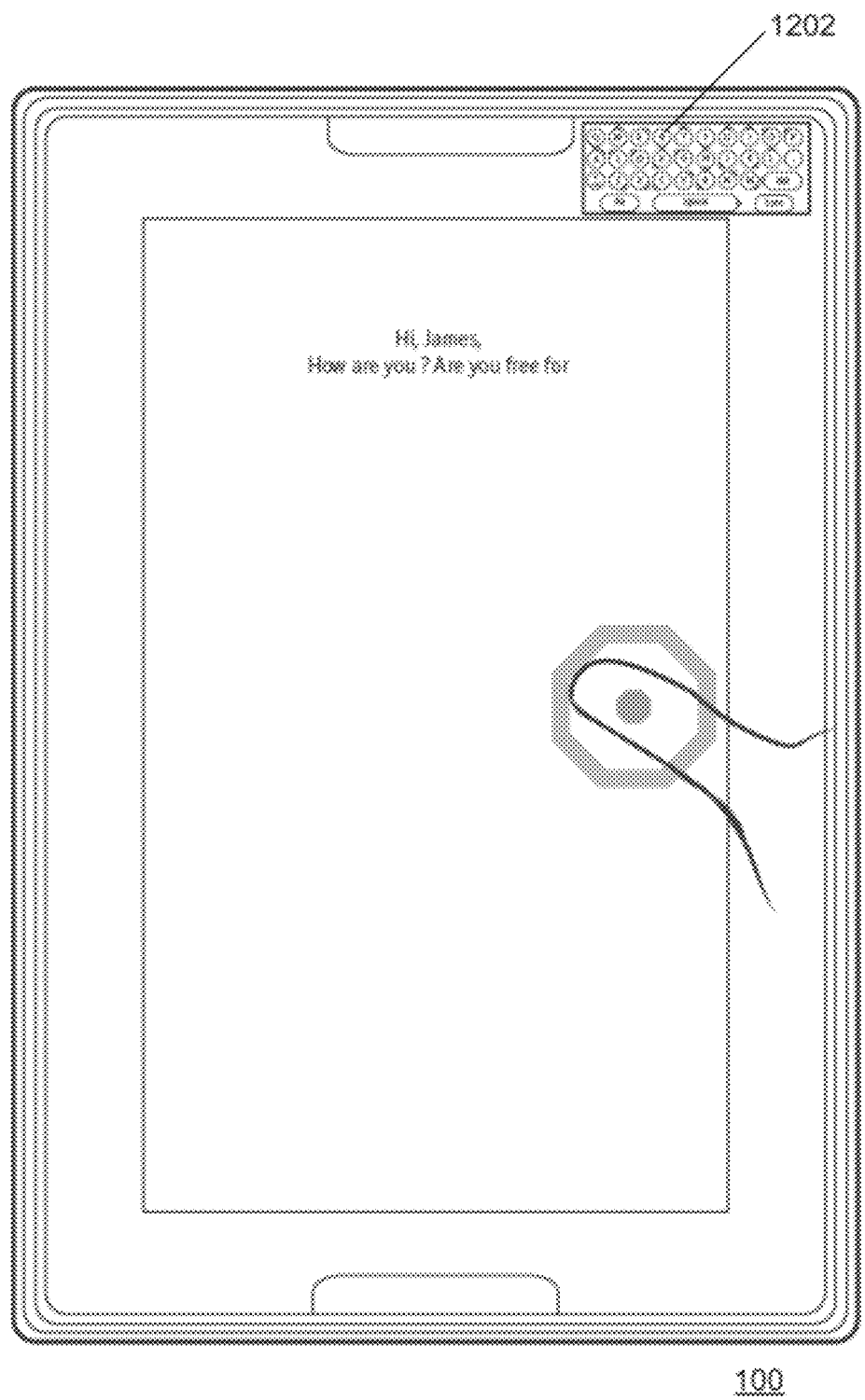
FIG. 12 illustrates another example of a portable electronic device in accordance with the present disclosure.

In the method according to FIG. 3, a picture or illustration of a keyboard may be included on a frame or bezel of the portable electronic device 100, as a sticker on the portable electronic device 100 or on a case for the portable electronic device 100, or any other suitable location, rather than displaying the keyboard because the directions associated with characters do not change. One example of a portable electronic device 100 including a sticker on the portable electronic device 100 rather than a displayed keyboard is illustrated in FIG. 12. The sticker 1202 in FIG. 12 is shown in the top, right corner of the portable electronic device 100. The sticker may alternatively be located at any other suitable location on the portable electronic device 100. Further, the illustration is not limited to an illustration on a sticker as the keyboard may be illustrated in any suitable manner.

Figure 13:
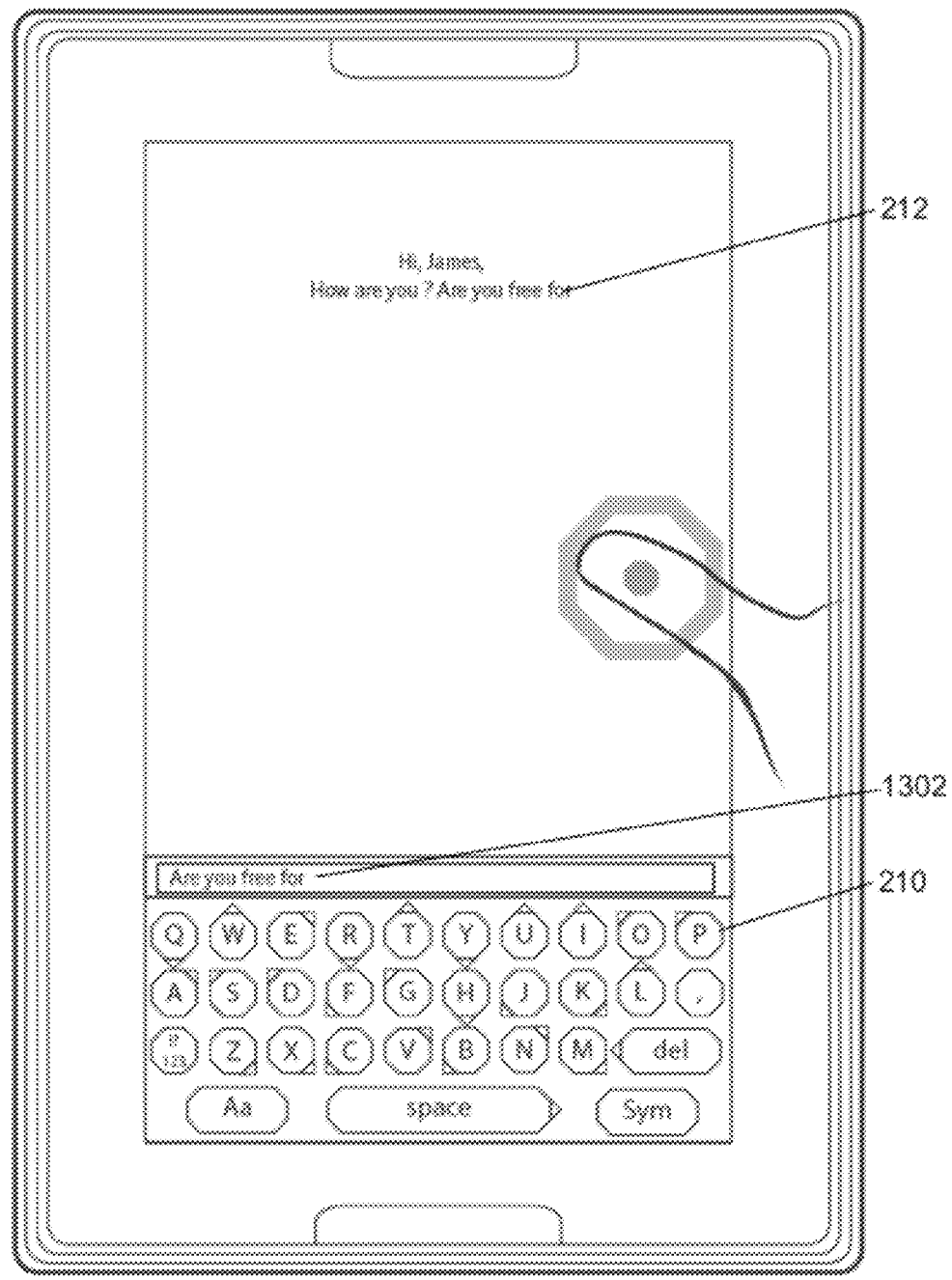
FIG. 13 illustrates another example of a portable electronic device in accordance with the present disclosure.

Optionally, characters that are entered in the field 212 may also be entered into a display area disposed above the keyboard 210. Referring to FIG. 13, the display area 1302 may be, for example a bar or box that is disposed near the keyboard 210 to facilitate viewing of the keyboard 210 and the characters entered, rather than glancing back and forth between the field 212 and the keyboard 210.

Figure 14:
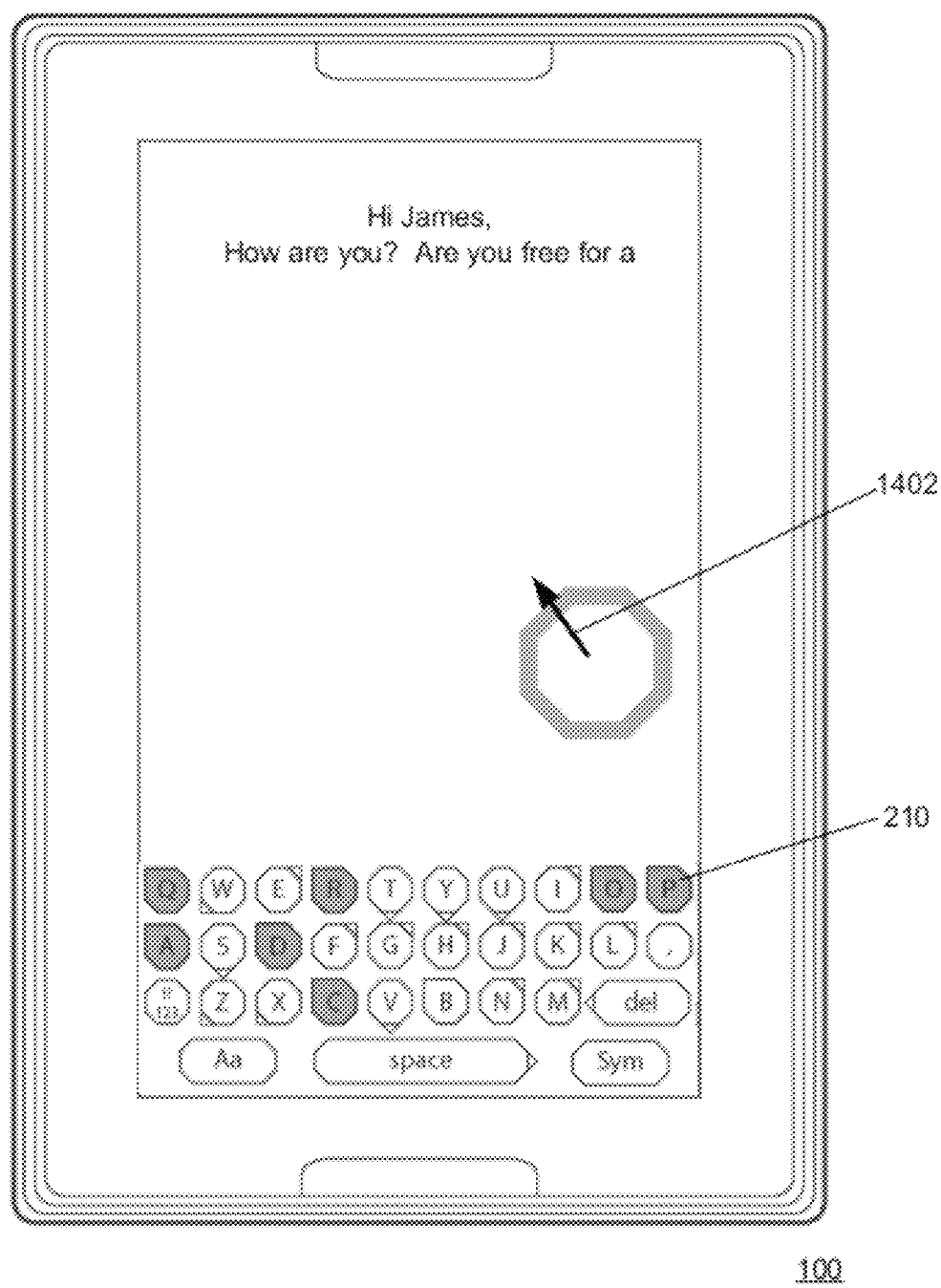
FIG. 14 illustrates another example of a portable electronic device in accordance with the present disclosure.

As indicated above, the keys for the letters associated with a gesture direction may be indicated, for example, by highlighting the keys based on the location of the touch prior to ending the touch. FIG. 14 illustrates one example of highlighting the keys of the keyboard 210 during the swipe 1402. The characters associated with the swipe direction 1402 are highlighted on the keyboard 210. A user may adjust the direction of the touch to highlight a different set of keys prior to ending the touch by moving the finger prior to lifting the finger from the touch-sensitive display 118.

In the examples illustrated in the figures and described above, the indicator is a hexagonal indicator to provide eight gesture directions and the keys have corresponding shapes. The indicator is not limited to a hexagonal indicator as other polygons may be utilized and corresponding numbers of gesture directions may be utilized. Thus, the indicator may include a fewer or greater number of sides and the keys may have corresponding shapes.

By entering a character entry mode, character entry is facilitated utilizing gestures on a touch-sensitive display. A particular number of directions may be utilized such that a gesture, that is associated with the character entry mode, is determined to be in one of the directions. The directions may be associated with a plurality of characters such that more than one character is associated with some of the directions. When a gesture that is associated with character entry is received, the characters associated with the gesture are determined and added to candidate character strings. The candidate character strings may be matched to stored objects for display and selection. The character entry mode may be entered and characters entered utilizing, for example, a single digit, such as a thumb. The distance travelled from start to end point of the gesture may be very short for entry of all characters and the characters may be entered from a single location or small area on the touch-sensitive display 118. The layout of the keyboard, which in the examples referred to above, is a QWERTY keyboard, is maintained and the keyboard may still be utilized for typing.

The gestures may be carried out at any suitable location on the touch-sensitive display and are not limited to the location of a keyboard. The keyboard may be displayed in a very small area or, alternatively, characters may be selected without displaying a keyboard. The character entry mode may be exited and other information or features may be selected on the touch-sensitive display.

According to one aspect, a method of controlling an electronic device, including a touch-sensitive display, includes detecting a gesture associated with a gesture character entry mode and determining a direction of the gesture on the touch-sensitive display, determining ones of a plurality of characters associated with the gesture based on the direction, and adding the ones of the plurality of characters to candidate character strings.

According to another aspect, an electronic device includes a touch-sensitive display, memory, and a processor coupled to the touch-sensitive display and the memory to carry out the method.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method of controlling an electronic device including a touch-sensitive display, the method comprising:

displaying, on the touch-sensitive display, a keyboard including a plurality of keys associated with characters, wherein each of the keys of the keyboard is associated with a respective one of the characters and said each of the keys of the keyboard includes an indicator to indicate a direction associated with the respective one of the characters;

simultaneously displaying the indicators associated with said each of the keys of the keyboard in a gesture character entry mode;

detecting a gesture associated with the gesture character entry mode and determining a direction of the gesture on the touch-sensitive display;

determining ones of the characters associated with the gesture based on the direction; and adding the ones of the characters to candidate character strings.

2. The method according to claim 1, comprising: identifying, from stored data, objects that at least partially match the candidate character strings; and displaying at least one of the objects on the touch-sensitive display.

3. The method according to claim 1, comprising detecting a touch and entering the gesture character entry mode based on attributes of the touch, prior to detecting the gesture.

4. The method according to claim 3, wherein the attributes of the touch comprise a duration of the touch.

5. The method according to claim 3, comprising displaying a gesture character entry mode indicator in response to entering the gesture character entry mode.

6. The method according to claim 5, wherein the gesture character entry mode indicator comprises a polygon displayed at a location of the touch.

7. The method according to claim 6, wherein the gesture associated with the gesture character entry mode comprises a gesture having an origin located within the polygon.

8. The method according to claim 1, wherein the gesture comprises a gesture that has an origin point that is not associated with the keyboard.

9. The method according to claim 1, wherein the direction of the gesture is matched to one of a plurality of character directions.

10. The method according to claim 9, wherein the characters are associated with ones of the plurality of character directions.

11. The method according to claim 1, comprising: identifying, from stored data, objects that at least partially match the candidate character strings;

and displaying a first plurality of the objects on the touch-sensitive display.

12. The method according to claim 11, comprising selecting one of the first plurality of the objects in response to detecting a touch at a location associated with the one of the first plurality of objects.

13. The method according to claim 11, comprising displaying a next plurality of the objects in response to receipt of an input to display further objects.

14. The method according to claim 13, wherein the input to display further objects comprises a gesture associated with the first plurality of the objects.

15. The method according to claim 1, comprising exiting the gesture character entry mode in response to receipt of a touch that is not associated with the gesture character entry mode.

16. The method according to claim 1, comprising associating at least one character with a direction that is different from a previous direction associated with the at least one character.

17. The method according to claim 1, comprising changing associated directions for character selection after detecting the gesture.

18. A computer-readable storage device having a computer-readable code executable by at least one processor of the portable electronic device to perform the method of claim 1.

19. The electronic device comprising:
the touch-sensitive display;
a memory; and
a processor coupled to the touch-sensitive display and the memory to execute a program stored in the memory to carry out the method according to claim 1.

* * * * *